Figure 1:
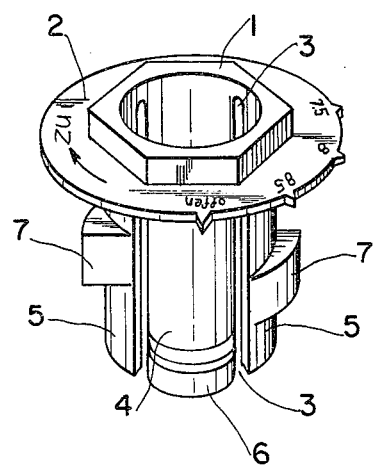

United States Patent [19]

Simon

[11] 4,169,572

[45] Oct. 2, 1979

[54] CABLE GROMMET WITH TENSION RELIEF

[76] Inventor: Hans Simon, Bruchhausener Strasse, 5463 Unkel, Rhein, Fed. Rep. of Germany

[21] Appl. No.: 850,196

[22] Filed: Nov. 10, 1977

[51] Int. Cl.² ............................................... F16L 5/00
[52] U.S. Cl. ................................. 248/56; 174/153 G; 285/81; 285/322; 339/103 R
[58] Field of Search ................................ 248/56, 27.3; 174/153 G, 152 G, 65 G; 339/103 B, 103 R, 103 M; 16/2, 108, 109; 285/162, 322, 81; 403/238, 239, 195, 197

[56] References Cited

U.S. PATENT DOCUMENTS

| 682,215 | 9/1901 | Mauer et al. | 174/152 G |
|---|---|---|---|
| 710,488 | 10/1902 | Mauer et al. | 16/108 X |
| 1,101,963 | 6/1914 | Rosenfeld | 285/322 |
| 1,224,269 | 5/1917 | Broadbent | 285/322 |
| 3,056,852 | 10/1962 | Sachs | 339/103 B X |
| 3,285,551 | 11/1966 | Tschanz | 174/153 G |
| 3,366,727 | 1/1968 | Rueger | 174/153 G X |
| 3,514,129 | 5/1970 | Holdren | 285/162 |
| 3,626,591 | 11/1971 | Buberniak | 339/103 R |
| 3,843,833 | 10/1974 | Nicholson | 174/153 G |
| 3,865,461 | 2/1975 | Ludwig | 339/103 R |
| 4,108,507 | 8/1978 | Renner et al. | 248/56 X |

FOREIGN PATENT DOCUMENTS 2042908  3/1972  Fed. Rep. of Germany ...... 174/153 G

*Primary Examiner*—Rodney H. Bonck
*Attorney, Agent, or Firm*—John S. Roberts, Jr.

[57] ABSTRACT

A cable grommet with tension or strain relief for the securement of cables in the aperture of a housing comprising two tubularly shaped and coaxially telescoped clamping portions being twistable towards each other, and the inner cross section of the outer portion, which is to be inserted into the aperture of the housing, deviates from the concentric circular cross section and the inner portion being coaxially inserted into the outer portion is divided, on one of its ends, by slots extending in axial direction over part of its length to form clamping jaws which on the outer side thereof, at least partly, are provided with circumferentially extending rising or tapering projections sliding on the inner wall of said outer portion and which when the two portions are twisted towards each other press the clamping jaws against the cable guided in said inner portion.

11 Claims, 14 Drawing Figures

CABLE GROMMET WITH TENSION RELIEF

The invention relates to a cable grommet with tension relief for the securement of cables in the opening of a housing.

The cable grommet according to the invention makes possible the mounting from the outside of the apparatus and provides in case of great area clamping of the cable within a relatively great clamping area an extraordinarily safe tension relief which may, additionally, be provided with a bend protection.

Cable grommets with tension relief have already been known in a plurality of modifications.

All of these prior art modifications however exhibit various deficiencies and disadvantages.

An essential disadvantage to be observed in almost all clamping devices is seen in that the clamping area is too small and therefore a pincer-like or punctual compression of the cable is obtained by which the cable to be clamped is excessively strained on the relatively small clamping area which leads to injury or damage of the cable in the use of the device provided therewith.

In prior art clamping devices, screws or other constructional parts working directly, are frequently employed. Although screws permit a continuous clamping range, they clamp decentrally and unilaterally.

The directly working constructional parts comprise, in most cases, single-step clamping devices for a plurality of cable diameters and include a pincer-like handle. This causes that for instance the smallest diameter may not be gripped correctly, while on the other hand the greatest diameter might be damaged by the clamping.

Numerous prior art clamping devices have too small clamping areas which additionally are provided relative to the main tension direction of the cable with sharp edges. This causes the formation of weak points and if strained, deformation of the cable is possible.

A further substantial disadvantage of the prior art cable inlet grommets with tension relief is seen in that said cable feed-throughs or inlet grommets must be prepared in advance. One part of the cable grommet must for instance be mounted from one side into the passage opening and fixation must be accomplished from the other side with the aid of a nut, a bolt or any other constructional element. Other prior art cable inlets must even be mounted, and fixed, from the inner side of the device.

Many prior art cable grommets exhibit furtheron the disadvantage that they are not stable enough for intercepting the pressure of the tension relief device exerted onto the cable. Rather they deform with the consequence that advance mounting for instance of the power supply cable in the cable grommet is not possible as a rule. Rather, the cable already provided with annular tongs, terminals, and other contact portions must painfully be guided through the small opening of the cable passage sleeve which very frequently includes additional transversal or gripping teeth directed against the cable to be passed.

A further disadvantage is finally seen in that the prior art cable grommets do not include means for adjusting, stepwisely and readably the clamping pressure for various cable diameters.

With a view to the disadvantages of the prior art cable grommets with tension relief described above, it is the aim of the present invention to provide a cable grommet with tension relief for the securement of cables in the opening of a housing which does not include the disadvantages shown above and which is characterized by a relatively large clamping area and safely and tension-relievingly secures the smallest diameter as well as the greatest diameter and wherein, by a relatively large clamping area, damage of the cable is safely avoided. It is at the same time simple to produce and easy to mount.

The problem according to the invention is solved by a cable grommet of the above described kind which is characterized by two tubularly shaped and coaxially telescoped clamping portions twistable towards each other the outer portion of which, which is to be inserted into the opening in the housing, deviates from the concentric circular diameter and the inner portion coaxially inserted or guided therein is divided on one of its ends by slots extending in axial direction over part of its length to form clamping jaws which on the outer side thereof, at least partly, are provided with circumferentially extending rising (i.e. tapering) projections provided on the inner wall of the outer portion and which when twisting the two portions towards each other press the clamping jaws against the cable guided in the inner portion.

In the above described cable grommet according to the invention, the whole clamping pressure is absorbed by the clamp itself, i.e. by the tubular outer portion, and it need not be transferred via a more or less sharp-edged location to the housing provided with the opening therefor. This results in the possiblity that a cable with a completely mounted grommet ready for use may be inserted by hand into the feed-through aperture of an apparatus.

The clamping movement of the clamping jaws takes place over a large area and parallel relative towards each other. Usually, the clamping area have no projecting edges. This has the consequence that the cable grommet with tension relief according to the invention, when in the open state, makes possible the passage of a cable while there are one edges or transversal ribs which would extremely impede such passage of the cable. The cable grommet according to the invention may be inserted from the outside into the housing wall and it may also be secured from the outside, if necessary it may also be tightened and reclamped later on.

The particular form of the inner opening of the outer portion which deviates from a concentric circular diameter may be of various shape, as when twisting the inner portion inserted into the outer portion always pressure is exerted onto the cable due to the geometry of the opening of the outer portion.

In accordance with an advantageous embodiment of the present invention, the outer portion is provided with an inner opening ellipse-shaped in diameter and the inner portion is divided into two clamping jaws which are provided over a portion, or over the whole length thereof, with elevations extending in circumferential direction. These elevations make also possible, in the non-tightened position, to insert the inner portion together with the cable provided therein into the outer portion, and by twisting the inner portion relative to the outer portion, the elevations provided on the clamping jaws move along the ellipsoid inner opening and in this way are more or less pressed, depending on the degree of twisting, against the cable.

In such a cable grommet, maximal pressing of the cable is obtained if the inner portion is twisted about an angle of about 90 degrees relative to the outer portion.

Instead of two clamping jaws, four clamping jaws could be employed as well, that is the inner portion may be subdivided by two further slots into four clamping jaws in total each of which is provided with projections arranged on the circumference thereof. In such a case, the outer portion has suitably a cross section opening which corresponds to two ellipses twisted relative to each other about 90 degrees.

In such an embodiment, maximum compression of the cable is obtained if the inner portion is twisted about 45 degrees relative to the outer portion.

The projections provided on the clamping jaws and rising in circumferential direction cooperate, in accordance with a further advantageous embodiment of the present invention, with profilings (as grooves, ribs and similars) provided on the tubular inner side of the outer portion and which extend in axial direction. In such an embodiment, the slowly rising projections on the clamping jaws provide for a continuous increase of the pressing force depending on the twisting degree.

Thus it is already sufficient if either the projections on the clamping jaws or the profilings provided on the inner side of the outer portions slowly rise or gradually increase in circumferential direction in order to so obtain a continuously increasing pressing force onto the cable provided within the inner portion. It is selfevident that also the elevations on the clamping jaws and the profilings provided on the outer portions may slowly rise in circumferential direction.

Arresting of the inner portion within the outer portion may axially be obtained in any feasible way. As the clamping forces do not have any influence on the respective axial position of the inner portion within the outer portion, any adjusting means may be employed in order to retain the inner portion in this position once insertion into the outer portion has been effected.

In accordance with an advantageous embodiment of the present invention, the inner portion is provided, on the end averted from the clamping jaws, with a circumferential front rim wholly or partly projecting beyond the outer portion, and at the end of at least one of the clamping jaws, there is provided a cam gripping behind the outer portion. The cam, or cams, respectively, provided on the end of the clamping jaws do by no means impede the insertion of the inner portion into the outer portion as the clamping jaws may easily be pressed together and may, in this way, be inserted, together with the cams provided thereon, into the opening of the outer portion. By axially shifting, the inner portion reaches the predetermined position within the outer portion and in this position the clamping jaws expand again and the cam, or the cams, respectively, provided thereon grip behind the outer portion and thus arrest the inner portion within the outer portion.

It has shown to be particularly advantageous if, on the end of at least two clamping jaws radially facing each other, one cam each gripping behind the outer portion is provided. In this way, the inner portion of the cable grommet according to the present invention is safely held in its position within the outer portion, and even after the compression of the clamping jaws against the cable, the cams extend usually that far above the rim of the outer portion that there is no danger of a disengagement of the inner portion from the outer portion and slipping out under the influence of the tension onto the cable.

If there are more than two clamping jaws, all the clamping jaws may of course be provided with corresponding holding cams.

In an advantageous embodiment of the cable grommet according to the invention, adjusting means are provided between the outer portion and the inner portion with the aid of which the position of the inner portion may be fixed relative to the outer portion. These adjusting means may be of various kind.

In accordance with a particularly advantageous embodiment of the present invention, the outer portion is provided with a front rim radially extending to the outside. On the front of the front rim of the outer portion, concentrically arranged detents are provided which engage with one or a plurality of cams provided on the inner portion.

In accordance with an advantageous embodiment of the present invention, the detents are provided as a sawtooth-like click-stop device and thus make possible the rotation of the inner portion relative to the outer portion only in a certain direction.

In such an embodiment, a disengagement of the cable secured within the cable grommet is possible only if the inner portion is twisted beyond the point of the maximum clamping force. The clamping force acting on the clamping jaws will automatically decrease and the cable is released.

For mounting the cable grommet of the invention, it has proved to be of advantage if the cam provided on the inner portion strikes against a stop when maximum pressing force is obtained, and the inner portion may be twisted beyond this stop only if the torque is substantially increased.

In this way, the fitter is in a position to immediately adjust the optimum clamping strength of the cable grommet of the invention without employing any further means.

In order to obtain a rather small and compact structure, it has shown, in accordance with the invention, to be suitable if the cams are provided on the side directed towards the outer portion of a circumferential rim of the inner portion which is radially projecting beyond the outer portion.

In accordance with a further advantageous embodiment of the invention, markings may be provided on the outer side of the circumferential rim of the inner portion projecting beyond the outer portion, which markings indicate the clamping force exerted on the cable at a given moment. The clamping force may be adapted to the inserted cable as concerns strength and compressability.

Although the cable grommet of the invention is usually inserted into circular openings of the housing aperture because such circular openings can very easily be made, it has shown, in accordance with an advantageous embodiment of the present invention, to be suitable if the outer portion of the cable grommet of the invention shows an outer cross section deviating from the circular form and is inserted into a housing aperture adapted to such outer cross section. In this way, the outer portion of the cable grommet is absolutely safe against twisting.

In accordance with a further advantageous embodiment of the present invention, a twist protection cam is provided on the usually circular outer periphery of the outer portion which extends in axial direction over part of the outer portion and is inserted into a correspondingly adapted recess in the housing aperture. Such a recess in the, normally circular, housing aperture may very easily be made so that also a fixation of the outer portion in the housing aperture is obtained which is absolutely safe against twisting.

Twisting of the inner portion relative to the outer portion may be reached by correspondingly providing handles on the inner portion.

Such handles however are relatively voluminous and for this reason it has shown, in accordance with a further embodiment of the present invention, to be suitable if means for the application of assembly tools are provided on the inner portion end averted from the clamping jaws.

A square or hexagon head provided on the inner portion end averted from the clamping jaws is partcularly suited for this purpose.

To this square or hexagon head for instance, a fixed spanner can be applied with the aid of which twisting of the inner portion relative to the outer portion can easily be obtained.

Fixation of the outer portion of the cable grommet according to the invention in the housing aperture may be obtained in various ways. Barbes may for instance be provided on the outer periphery of the outer portion which when the outer portion is inserted into the housing aperture clench into the reverse side thereof and thus secure the outer portion within the housing aperture.

In accordance with a further advantageous embodiment of the present invention, the outer portion is provided over at least part of its length with two recesses extending in the direction parallel to the axis and facing each other within which one pair of blocking wings is provided being in parallel to the axis and extending, with the wing ends, beyond the outer periphery of the outer portion.

Such blocking wing pairs simplify the fitting of the outer portion into the housing aperture and safeguard a correct fixation of the outer portion.

The blocking wing ends extending beyond the outer periphery of the outer portion may easily so be bent that they fall within the outer periphery of the outer portion so that the outer portion may easily be inserted into the housing aperture. Immediately after the passage of the blocking wings through the opening of the housing aperture they regain their old position and adjust the outer portion within the housing aperture. The distance between the end of the blocking wing and the front rim of the outer portion has so been chosen that the housing wall is just locked between front rim and blocking wing end.

In accordance with a further advantageous embodiment of the present invention, the blocking wings are chamfered towards the front rim of the outer portion. With the aid of such an embodiment according to the invention, the cable grommet may be inserted into passage walls of various thicknesses as the chamferings of the blocking wings will slowly lock the housing wall.

Futheron, it has shown to be of advantage if the blocking wings are also chamfered on the end averted from the front wall. Such a chamfering, particularly if relatively flat, makes the insertion of the outer portion, together with the blocking wings, substantially easier.

On the inner portion of the cable grommet according to the invention, there may be provided, in accordance with a further advantageous embodiment of the present invention, on either one or on both of its ends, a bend protection sleeve. Such a bend protection sleeve may integrally be produced together with the cable grommet.

The cable grommet of the invention consists preferably of plastic material and is suitably produced in an injection molding process.

Figure 2:
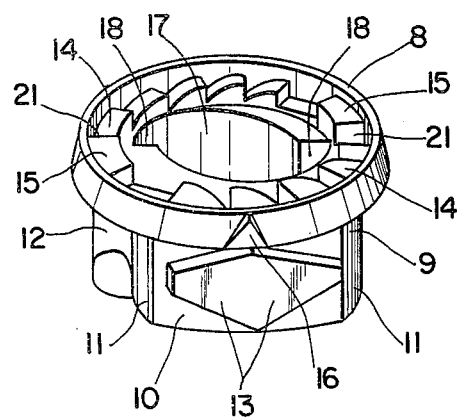
Figure 3:
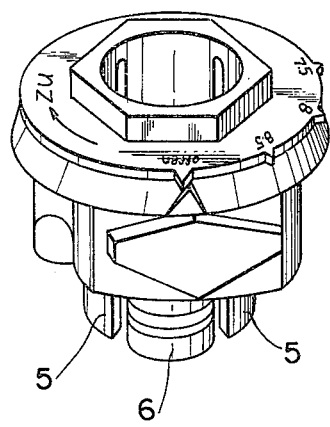
Figure 4:
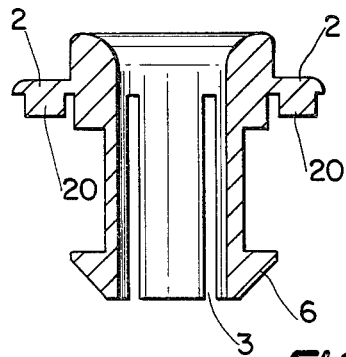
Figure 5:
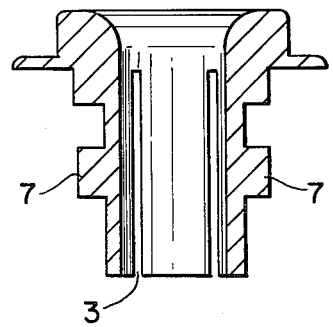
Figure 6:
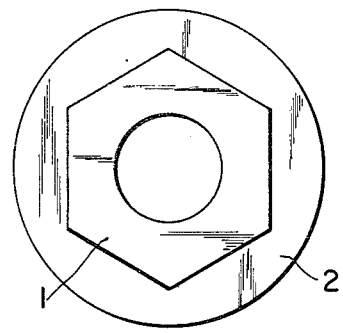
Figure 7:
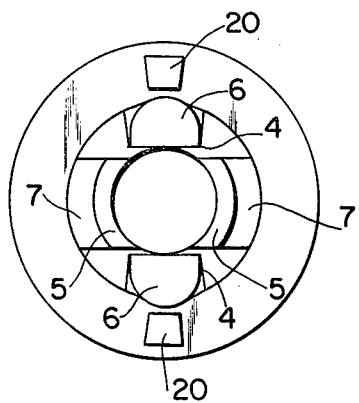
Figures 8, 9:
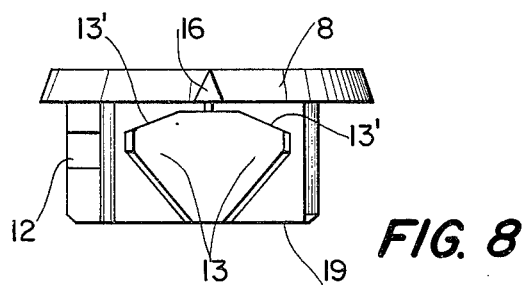
Figure 10:
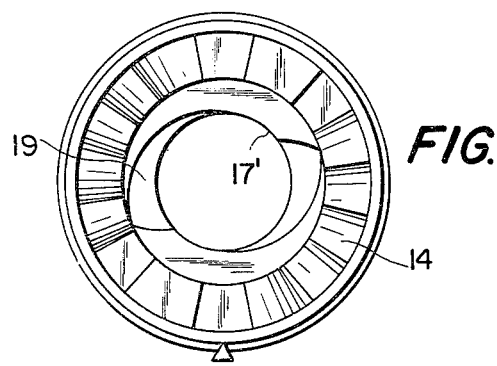
Figure 11:
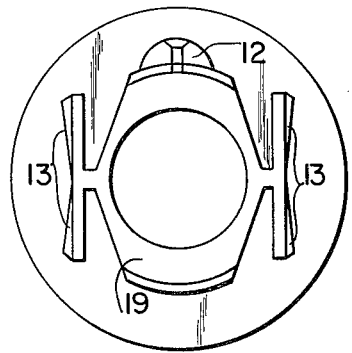
Figure 12:
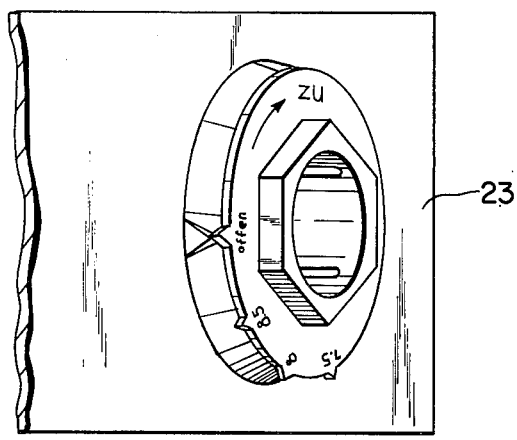
Figure 13:
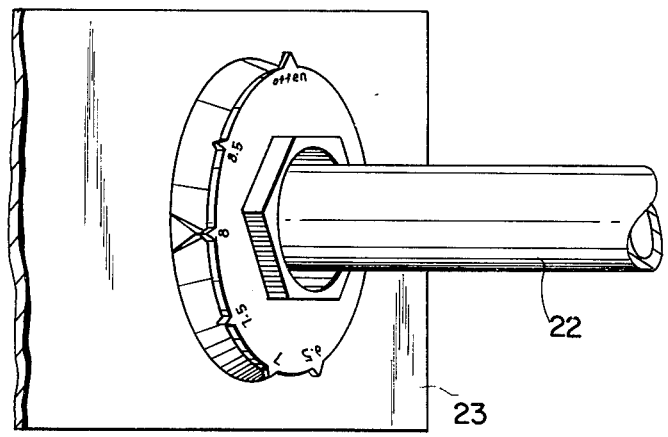
Figure 14:
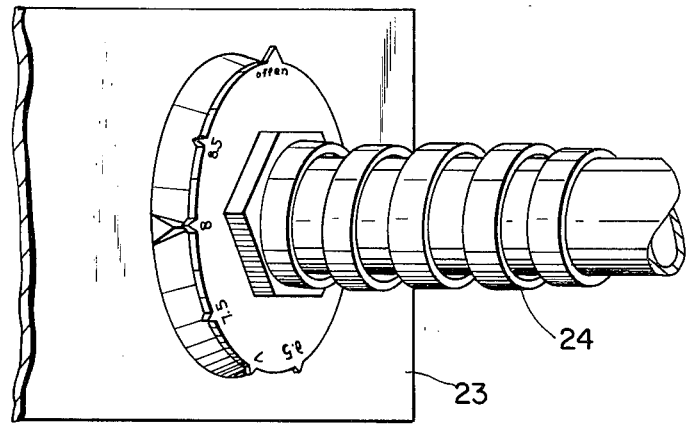

The invention will more readily be understood from the following description of exemplified embodiments thereof with reference to the accompanying drawings in which FIG. 1 is a perspective lateral view of the inner portion of the cable grommet according to the invention, FIG. 2 is a perspective laterial view of the outer portion of the cable grommet, FIG. 3 is a perspective lateral view of the assembled cable grommet, FIG. 4 is a cross section of the inner portion, FIG. 5 is a different cross section of the inner portion, but 90° offset, FIG. 6 is a top view of the inner portion of the cable grommet, FIG. 7 is a top view of the rear end of the inner portion, FIG. 8 is a lateral view of the outer portion, FIG. 9 is a different lateral view of the outer portion, but 90° offset, FIG. 10 is a top view of the outer portion, FIG. 11 is a top view of the rear end of the outer portion, FIG. 12 is a lateral view of a grommet according to the invention inserted into a housing wall, FIG. 13 is a lateral view of a cable grommet according to the invention inserted into a housing wall and with a cable clamped therein, FIG. 14 is a lateral view of a cable grommet according to the invention inserted into the housing wall and with a bend protection sleeve provided on the inner portion.

The inner portion of the cable grommet according to the invention shown in FIG. 1 comprises a cylindric hollow body including on its top end a hexagon head 1 for the application of the mounting tool and a circumferential rim 2 beneath it including markings from which the respective position of the inner portion relative to the outer portion can be taken. From its lower end, the cylindric hollow body is divided, by axial slots 3, into two quarter cups 4 and 5 each facing each other. On the free ends of each quarter cup 4, outwardly directed holding cams 6 are provided. On each of the quarter cups 5 which are shaped as the clamping jaws there is provided, in the middle, a projection 7 rising in peripheral direction to the outside. The length of slots 3 may extend until the vicinity of the upper end of the cylindric hollow body.

The outer portion shown in FIG. 2 comprises also hollow body 9, provided with front rim 8 radially projecting beyond the outer portion, which on part of its length is provided with two recesses 10 extending in a direction parallel to the axis and facing each other as well as with roundings 11. On one of roundings 11, a twist resistance cam 12 is provided in the middle extending in a direction parallel to the axis while on each of the two recesses facing each other a blocking wing pair 13 each is positioned. Front rim 8 includes on its front side detents 14 which face each other in pairs; two stop blocks 15 are furtheron provided which are also arranged facing each other.

Radially towards the outside, detents 14 are masked by an edge on which marking 16 is provided. The inner opening 17 of the outer portion or member includes a somewhat ellipsoid base contour through part of its length and a circular end opening 17' to define two recesses 18 facing each other and corresponding to projections 7 an the inner portion or member according to FIG. 1. These recesses are closed by the circular front rim of opening the 17' inner diameter of which corresponds to the smallest diameter of recess 18. The shape and the arrangement of front rim 8 may be taken from FIGS. 10 and 11 discussed in detail lateron.

The inner portion of the cable grommet according to the invention is inserted as indicated by the arrow shown between FIGS. 1 and 2 into the outer portion according to FIG. 2 so that the holding cams 6 adjustingly engage lower flange 19 of the outer portion. The free ends of quarter cups 5 extend also beyond the outer portion while the elevations 7 provided on quarter cups 5 are nestled in recesses 18 of the outer portion.

FIG. 3 shows a lateral view of the cable grommet from the inner portion according to FIG. 1 inserted into the outer portion according to FIG. 2. The lower ends of the two quarter cups 5 extend from the outer portion. The same is the case for holding cam 6 provided on quarter cup 4 arranged therebetween.

FIG. 4 shows a cross section of the inner portion according to FIG. 1, however, turned about 90° so that the quarter cups 4 provided with holding cams 6 are shown in cross section. In FIG. 4, stop cams 20 provided on the lower side of circumferential rim 2 may clearly be seen which engage with detents 14 of the outer portion and fix the position of the inner portion relative to the outer portion. When the inner portion is inserted into the outer portion, stop cam 20 each are arranged in front of the first detent 14, within each facing recess 21, which may be identified in FIG. 2.

If the inner portion is clockwisely twisted relative to the outer portion, the following will happen:

Stop cams 20 each will move to a further detent stop while projections 7 on quarter cups 5 are concentrically guided towards each other until, finally, the last detent pair has been passed and the greatest clamping movement has been effected.

In the embodiment shown, quarter cups 4 are provided without elevations, they include only the holding cams 6 at their free ends which engage behind the flange 19 of the outer portion and fix the inner portion within the outer portion. The quarter cups 5 and the projections provided thereon move inwardly during the twisting movement of the inner portion relative to the outer portion while the quarter cups 4 do not and thus the holding cams 6 do not disengage from flange 19 towards the inside and allow release of the inner portion. It is therefore impossible, whether or not a cable is inserted, to remove the inner portion of the cable grommet from the outer portion after twisting. Neither the quarter cups 4 nor quarter cups 5 shaped as clamping jaws require, in the inside area facing the cable, ribs or special clamping attachments that could prevent the passage of the cable. The free ends of quarter cups 5 serve as an enlargement of the clamping area and avoid the formation of sharp edges that could damage the cable.

As has already been mentioned in connection with FIG. 2, the outer portion includes two blocking wing pairs 13 each the upper edges of which directed towards circumferential rim 2 are chamfered as at 13' and thus slope away from the circumferential rim. By this advantageous shape of the blocking wing pairs, it is possible that the blocking wings may continuously secure the cable grommet within walls the thickness of which may vary within a relatively extended range. The thickness may correspond to the smallest as well as to the greatest distance between circumferential rim 8 and the chamfered edge of blocking wing 13.

Instead of blocking wing pairs 13, other fixing elements may selfevidently be employed as well, such as lock-up sheets, latches, cams etc, blocking wings, however, displaying substantially greater advantages as concerns the simple fitting and the rigid fixation thereof.

The twist resistance cam 12 on the outer portion engages in a corresponding recess of a cable passage opening and prevents twisting or turning of the outer portion relative to such opening.

Opening of the cable grommet and releasing the cable being tension-relievingly secured in the interior of the inner portion, is so carried-out that the inner portion is forcibly moved, for instance with a fixed spanner engaging with the hexagon head 1, together with its stop cam 20 beyond stop blocks 15 which on their side show very steep flanks and are somewhat higher than detents 14 so that the opening process can clearly be differentiated from the closing process of the device. Closing and opening can even accustically be differentiated as a well audible click marks the closing whereas a well distinguishable crack indicates opening.

In FIG. 5, there is shown a cross section through the inner portion which, however, is turned about 90° relative to the cross section of FIG. 4. Thus the opening cups 5 are shown together with the projections 7 on the outer face in cross section.

The top view shown in FIG. 6 of the inner portion exhibits hexagon edge 1 and circumferential rim 2.

The top view shown in FIG. 7 of the bottom side of the inner portion displays stop cams 20 arranged under circumferential rim 2 as well as quarter cups 4 together with the holding cams 6 provided thereon and quarter cups 5 together with elevations 7 provided thereon.

FIG. 8 shows a lateral view of the outer portion with a top view of blocking wing pairs 13 arranged in recess 10, wherein not only the end directed towards the front rim 8 is provided with chamferings 21 but also the other end, which makes the insertion of the outer portion into the housing aperture substantially easier.

FIG. 9 shows also a cross section of the outer portion which is, however, turned about 90°. In this position, the blocking wings 13 are also shown in side view.

The twist resistance cam 12 is now also very clearly visible.

FIG. 10 shows a top view of the outer portion displaying detents 14 and the ellipse-shaped form of the inner opening 17 for reception of projections 7.

The top view shown in FIG. 11 of the lower end of the outer portion displays the blocking wings pairs 13, the twist resistance cam 12 and the lower exactly circular flange 19, behind which the holding cams 6 engage.

In FIG. 12, a cable grommet with tension relief according to the invention is shown in the wall of a housing 23.

FIG. 13 shows the same cable grommet with tension relief wherein, however, a cable has been inserted and tension-relievingly been clamped.

The clamping pressure or the clamping movement, respectively, may be read from the scale provided on the inner portion.

FIG. 14 shows the same cable grommet of the invention with tension relief wherein the inner portion is provided with an integral prior art helical bend protection 24.

I claim:

1. A two-part strain relief cable grommet for securing cables in an opening in a carrier member including two tubular outer and inner body members coaxially telescopicably engageable one within the other and rotatable relative to one another, said outer body member being insertable in said opening, said outer body member having less axial extent than said inner body member and having an innner wall surface of generally ellipsoidal contour in cross section, said inner body member including a generally tubular portion divided by axial slits extending over part of its length into four segmental jaws terminating in free ends, the outer surface of two oppositely facing jaws at a location spaced inwardly from their free ends having outwardly extending gradually circumferentially increasing projections engageable against the inner walls surface of said outer body member so that upon relative rotation of said members said two jaws move inwardly towards one another to engage a cable guided through said inner member and said other two oppositely facing jaws having locking cams projecting outwardly from their free ends and engageable with end portions of said outer body member to hold said body members together.

2. Cable grommet according to claim 1 wherein the inner wall surface of said outer body member has profilings extending in the axial direction which cooperate with said projections provided on said first mentioned jaws.

3. Cable grommet according to claim 2 wherein said profilings provided on the inner wall surface face of said outer body members are shaped complemental to said projections on said first mentioned jaws.

4. Cable grommet according to claim 3 wherein said inner body member is provided on its end remote from said free ends of said jaws with a circumferential rim means extending beyond said tubular portion of said outer body member and having an inner face having at least one stop cam engageable with said outer member.

5. Cable grommet according to claim 1 and including adjusting means cooperably related between said outer and inner body members by which the position of said inner member relative to said outer member may be fixed.

6. Cable grommet according to claim 5 wherein said outer body member includes an outwardly extending front rim means and said adjusting means include on said front rim means concentric detents with which said at least one stop cam is engageable.

7. Cable grommet according to claim 6 wherein a stop block is provided in said detent ring against which said at least one stop cam provided on said inner body member will abut when the maximum compression of said first mentioned jaws is reached.

8. Cable grommet according to claim 6 and said rim means having cooperable markings which indicate the compression force acting upon the cable at a given moment.

9. Cable grommet according to claim 1 and a twist resistance cam provided on the outer periphery of the tubular portion of said outer body member.

10. Cable grommet according to claim 1 and means for the application of mounting tools disposed at the end of said inner body member remote from the free ends of said jaws.

11. Cable grommet according to claim 10 and said means comprising a tool receiving head.

* * * * *